United States Patent [19]

Suzuki et al.

[11] Patent Number: 4,926,410
[45] Date of Patent: May 15, 1990

[54] DISK

[75] Inventors: Akira Suzuki; Kenji Takahashi, both of Miyagi, Japan

[73] Assignee: Sony Corporation, Tokyo, Japan

[21] Appl. No.: 178,293

[22] Filed: Apr. 6, 1988

[30] Foreign Application Priority Data

Apr. 6, 1987 [JP] Japan .................................. 62-084313

[51] Int. Cl.⁵ ........................ G11B 17/02; G11B 19/20
[52] U.S. Cl. ..................................... 369/290; 369/271
[58] Field of Search ............... 369/270, 280, 281, 282, 369/289, 290; 360/133, 135

[56] References Cited

U.S. PATENT DOCUMENTS 4,829,510  5/1989  Takehashi ........................... 369/271

FOREIGN PATENT DOCUMENTS

276765  7/1951  Switzerland ........................ 369/282
366995  3/1932  United Kingdom ................ 369/282

Primary Examiner—Steven L. Stephan
Attorney, Agent, or Firm—Lewis H. Eslinger; Jay H. Maioli; Donald S. Dowden

[57] ABSTRACT

A disk includes a substrate of the disk provided with a recording medium to and from which information signals are recorded and/or reproduced, and a disk hub provided with a metal plate formed with an engaging projection and a supporting member having a mating engaging section engaged by the projection of the metal plate, the supporting member being secured to the central portion of the substrate of the disk. According to the present invention, a retaining section is provided to the major surface or to the perimeter of the supporting member, and a holding member is engaged in the retaining section to prevent the supporting member from being turned with respect to the substrate of the disk when the metal plate is turned in a prescribed attachment direction so as to be attached to the supporting member.

15 Claims, 8 Drawing Sheets

DISK

BACKGROUND OF THE INVENTION

1. Field of the Invention

This invention relates to a disk, such as an optical disk, applied to a recording and/or reproducing apparatus of the magnet clamp type and more particularly to a disk having at the central portion thereof a disk hub attracted and supported by a magnet of the disk drive unit.

2. Description of the Prior Art

Up to the present, a disk such as an optical disk has been known and used as the recording medium for information signals.

In the recording and/or reproducing apparatus employing the disk as the recording medium, the recording and/or reproducing operation is performed by irradiating the rotary recording surface of the disk with a light beam emanating from a light source, such as a semiconductor laser, as the disk is rotated at an elevated speed of several hundreds to one thousand and several hundreds of revolutions per minute. For assuring the high speed rotation of the disk, there is provided a clamp means whereby the disk can be connected to the disk drive unit provided in the recording and/or reproducing apparatus for rotation at an elevated speed. As such clamp means, there is proposed a so-called magnet clamp type system according to which a metal plate is provided on the disk hub arranged at the central portion of the substrate of the disk so as to be attracted by a magnet provided on the disk driven unit. There is also proposed a disk applicable to a disk drive unit employing the magnet clamp type clamp means.

It will be noted that, in the case of a disk applied to the aforementioned disk drive unit of the magnet clamp system, a metal plate need be affixed to the disk hub provided to the center of the substrate of the disk. For this reason, the disk hub is constituted by a supporting member secured to the substrate of the disk and a magnetic metal plate for clamping. The supporting member is formed of synthetic material in order to be secured and consolidated to the substrate of the disk similarly formed of synthetic material. Thus the thermal contraction coefficient of the metal plate differs from that of the supporting member. Thus, when the metal plate is integrally attached to the supporting member by metal die molding, such as outsert molding, to constitute a disk hub, and the disk hub is secured as by ultrasonic welding to the substrate of the disk, an unnecessary stress may be induced at the welding surface of the substrate of the disk thus occasionally distorting its major surface. Such distortion in the major surface of the substrate of the disk may cause double refraction in the light beam incident on or reflected from the substrate of the disk at the time of recording and/or reproduction thus frequently causing errors in reading and writing information signals.

Thus there is proposed a disk provided with a disk hub wherein, for attaching the disk hub to the substrate of the disk without causing distortion at the major surface of the substrate of the disk, the supporting member and the metal plate constituting the disk hub are prepared separately from each other, the supporting member by itself is secured to the substrate of the disk and the metal plate is ultimately attached to the supporting member.

Figure 1:
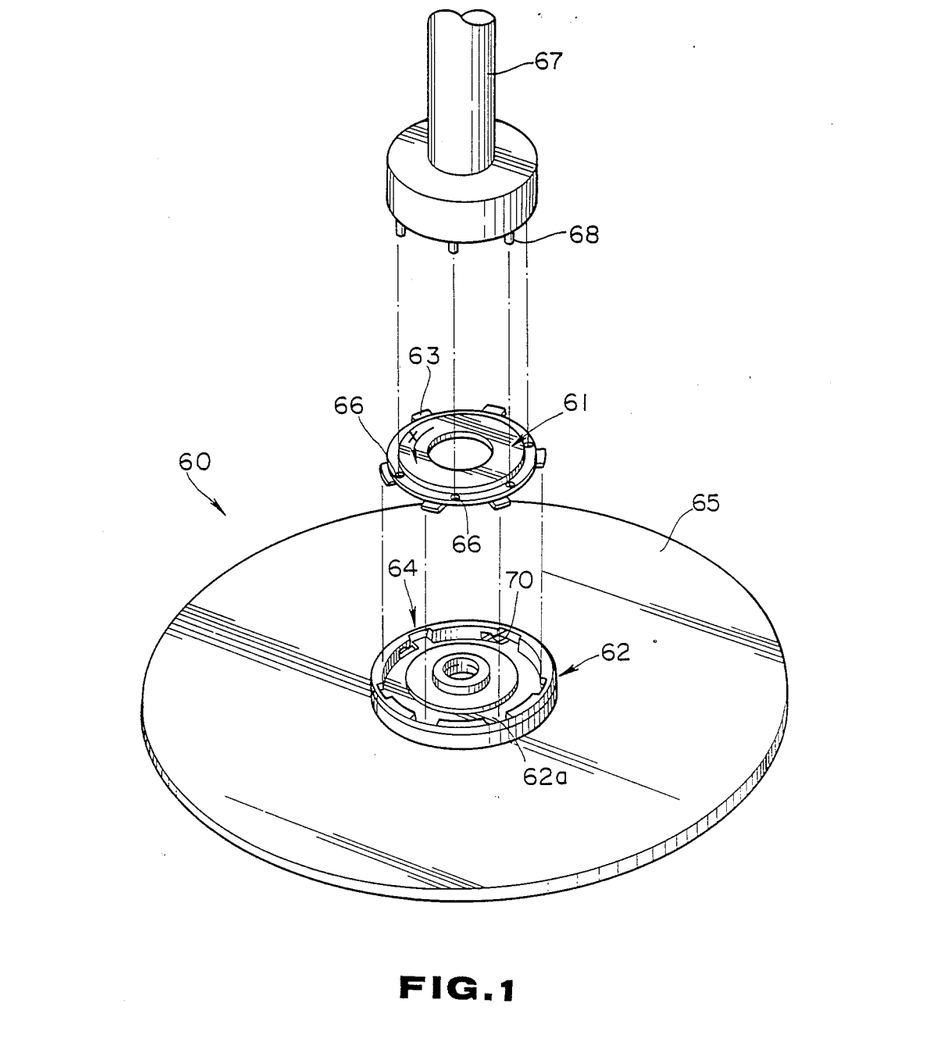
FIG. 1 is a perspective view showing attachment means for the metal plate in the conventional disk.

Such disk is shown for example in FIG. 1.

The disk 60 shown in FIG. 1 is engaged with and supported by one major surface 62a of a metal plate supporting member 62 by turning a metal plate 61 in a prescribed mounting direction, herein in the direction of an arrow marked X, with respect to the supporting member 62, such that engaging projections 63 on the outer periphery of the metal plate 61 will be engaged with mating engaging portions 64 of the supporting member 62. This supporting member 62 is attached to a substrate of the disk 65 by having its other major surface secured to the center of the major surface of the substrate of the disk 65.

In the above disk 60, when attaching the metallic plate 61 to the supporting member 62, retaining projections 68 of a jig arm 67 are engaged in a plurality of through-holes 66 formed on the perimeter of the metal plate 61 and the jig arm 67 is turned to cause the metallic plate 61 to be turned in a metallic plate containing section 69 of the metallic plate supporting member 62 for engaging the engaging projections 63 of the metallic plate 61 with the mating engaging portions 64 of the supporting member.

It will be noted that, once the metal plate 61 is attached to the metal plate supporting member 62, it should be secured against accidental detachment from the supporting member 62. To this end, a hook 70 is provided to each of the mating engaging portions 64 of the metal plate supporting member 62 to prevent accidental removal of the metal plate 61.

However, when these hooks 70 are provided to the supporting member 62, a considerable torque will be required in engaging the projections 63 in the mating engaging portions 64 over these hooks 70. Consequently, when engaging the metal plate 61 with the metal plate supporting member 62, an unnecessary stress is produced at the attachment surfaces of the supporting member 62 and the substrate of the disk 65. In addition, when the metallic plate 61 is turned in the direction of engaging the projections 63 of the metal plate 61, the force of rotation is also applied to the supporting member 62, so that the stress accompanying the force of rotation acts on the attachment surfaces of the supporting member 62 and the substrate of the disk 65, as the shearing force, thereby the force of securing the metal plate supporting member 62 to the substrate of the disk 65 being occasionally lowered.

It will be noted that, when the metal plate supporting member 62 is not secured sufficiently strongly to the substrate of the disk 65, a disk hub may be dismounted from the substrate of the disk under the force of attraction of a magnet secured to a disk table to effect magnetic clamping through magnetic attraction of the metal plate, at the time the disk is placed on or detached from the disk table of the recording and/or reproducing apparatus, with resulting malfunction of the disk.

OBJECT AND SUMMARY OF THE INVENTION

It is an object of the present invention to provide a disk, such as an opto-magnetic disk or optical disk, which may be applied to a magnet clamp type disk drive unit.

It is another object of the present invention to provide a disk wherein double refraction of the light beam incident on or reflected from the disk during recording and/or reproduction of information signals may be prevented.

It is a further object of the present invention to provide a disk wherein the supporting plate of synthetic material, to which the metal plate for magnet clamping is strongly affixed, is mounted on the substrate of the disk of synthetic material so as to prevent the disk hub constituted by the metal plate and the supporting member from becoming dismounted from the substrate of the disk.

It is a further object of the present invention to provide a disk having a disk hub, wherein the metal plate for magnet clamping is turned to engage the projection of the metal plate with the mating engaging section of the supporting member to attach the metal plate to the supporting member, said supporting member being separately supported to prevent the force of rotation from being applied to the supporting member to enable the supporting member to be strongly affixed to the substrate of the disk.

It is a further object of the present invention to provide a disk wherein the metal plate may be reliably attached to the supporting member without the risk of accidental detachment thereof from the supporting member.

It is a further object of the present invention to provide a method for producing a disk, such as an opto-magnetic disk or optical disk, wherein the metal plate can be attached to the supporting member secured to the substrate of the disk so that the force tending to turn the supporting member is not applied to the supporting member.

It is a further object of the present invention to provide a method for producing a disk whereby the metal plate may be easily and reliably attached to the supporting member.

In accordance with the present invention, the disk hub is formed by a metal plate for magnet clamping which is provided with an engaging projection and a supporting member for the metal plate having a mating engaging section in a metal plate containing section on its one surface, with the other surface of the supporting member being secured to the central portion of the substrate of the disk with the projection of the metal plate engaging in the mating engaging section of the supporting member. The perimeter or a major surface of the supporting member is provided with a retaining section for engagement with a holding member whereby, when turning the metal plate in the prescribed attachment direction for attachment to the supporting member, the supporting member is prevented from being turned simultaneously. When the projection of the metal plate is turned so as to be engaged with and supported by the mating engaging section of the supporting member, the latter is controlled in its position by the holding means engaging in the retaining section so that the force of rotation applied to the metal plate is not transmitted to the supporting member. Since no force of rotation is produced in the supporting member, no stress is induced in the attachment portions between the substrate of the disk and the supporting member, so that no strain is induced in the substrate of the disk and double refraction of the light beam may be inhibited when the light beam is caused to be incident on or refracted from the substrate of the disk.

In accordance with the present invention, there is also provided a method for producing a disk having a disk hub, the disk including a metal plate attracted by a magnet provided to driving means provided in turn in a recording and/or reproducing apparatus, and a supporting member for the metal plate, the metal plate being attached to one surface of the supporting member, the other surface of the supporting member being secured to a substrate of the disk, the method comprising the steps of securing the supporting member to the central portion of the substrate of the disk by securing means, holding the thus secured supporting member by holding means so that the supporting member is not turned with respect to the substrate of the disk, and turning the metal plate by attachment means for attaching the metal plate to the supporting member held by the holding means.

These and other objects, features and advantages of the present invention will become apparent from the following detailed description of the preferred embodiments that are to be read in conjunction with the accompanying drawings, throughout which like reference numerals identify like elements and parts.

DESCRIPTION OF THE PREFERRED EMBODIMENTS

In the accompanying drawings, there are illustrated certain preferred embodiments of the disk according to the present invention.

Figure 2:
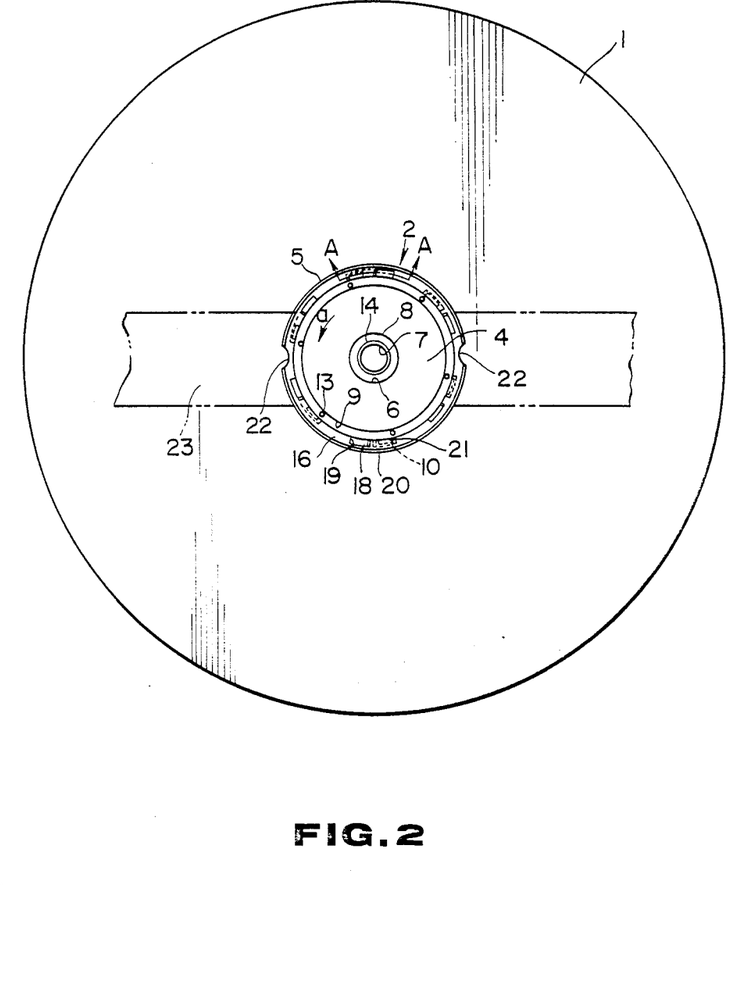
FIG. 2 is a plan view of the disk according to a first embodiment of the present invention.
Figure 3:
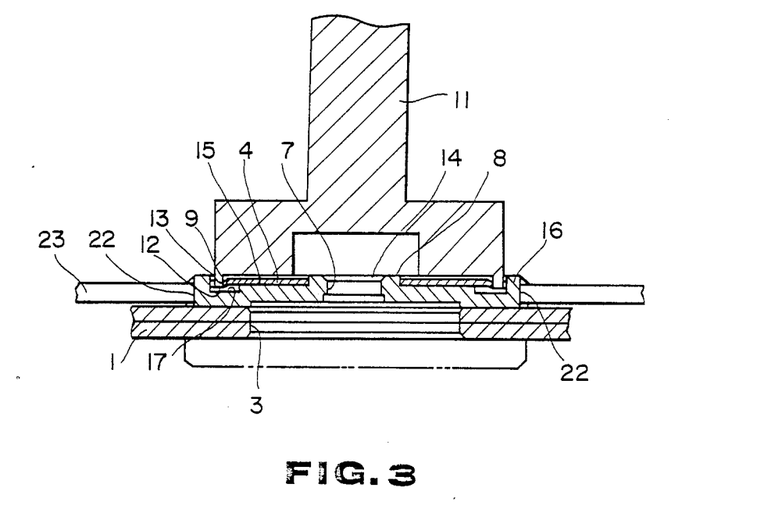
FIG. 3 is a diagrammatic sectional view showing the state of attaching the metal plate to the metal plate supporting member of the disk shown in FIG. 2.
Figure 4:
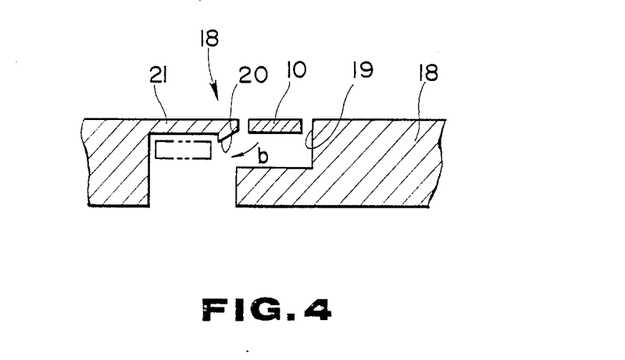
FIG. 4 is a sectional view taken along line A—A of FIG. 2.

Referring first to FIGS. 2 to 4, a first embodiment of the present invention will be explained.

The disk shown in these figures is designed as an optical disk wherein a disk hub 2 for clamping the optical disk to a disk drive unit is mounted centrally of a substrate of the disk 1.

The substrate of the disk 1 is molded from synthetic materials such as polycarbonate or glass in the form of a disk. Two such substrates 1 on each of which is formed the record layer, are bonded back to back to each other with a reflective film therebetween so as to be used as a double-sided optical disk adapted for recording and/or reproduction. Each of the substrates 1 is formed with a central hole 3.

The disk hub 2 attached to the center of the substrate of the disk is mainly formed by a magnetic metal plate 4 and a metal plate supporting member 5 which is secured onto the substrate of the disk 1 and on which the metal plate 4 is supported, as shown in FIG. 2.

The metal plate 4 is used for magnetic clamping, that is, it is attracted to a magnet provided to the recording and/or reproducing apparatus when the disk is attached to the disk drive unit of the recording and/or reproducing apparatus.

The metal plate 4 is formed as a circular plate having a central hole 6. The central hole is of such a diameter as to receive snugly the peripheral wall 8 surrounding a spindle hole 7 formed in the metal plate supporting member 5. The outer peripheral edge of the metal plate 4 is formed with a step or shoulder 9 having a height about half its thickness and a plurality of engaging projections 10, as shown in FIG. 3 and FIG. 4.

A plurality of jig engaging holes 13 are formed in the step 9 so as to be engaged with positioning projections 12 of a supporting arm 11 which is employed for engaging the metal plate 4 with the metal plate supporting member 5 for attaching the metal plate 4, as shown in FIG. 3.

The metal plate supporting member 5 is a flattened column molded from synthetic materials, as shown in FIG. 3, and has the aforementioned central spindle hole 7 in which a center spindle of the disk drive unit is engaged. The spindle hole 7 is surrounded by the peripheral wall 8 on the side corresponding to one major surface of the metal plate supporting member 5. The end of the peripheral wall 8 of the spindle hole 7 is formed with an inclined surface 14 adapted for guiding the spindle. The outer side of the peripheral wall 8 is formed with a first annular recess 15 acting as a container for the metal plate. The outer periphery of the metal plate supporting member 5 is formed with an upstanding wall 16.

The upstanding wall 16 of the supporting member 5 is formed with a second annular recess 17 deeper than the aforementioned first annular recess 15. This second annular recess 17 is adapted for containing the step 9 of the metallic plate 4.

The upstanding wall 16 is also formed with mating engaging sections 18 in register with the engaging projections 10 of the metal plate 4. Each of these mating engaging sections 18 is formed by partially cutting the upstanding wall 16 and, as shown in FIG. 4, formed by an inlet portion 19 into which the engaging projection 10 is engaged and retained and a retaining portion 21 having a projection 20 for engaging with and retaining the engaging projection 10. The retaining portion 21 is provided in the same peripheral direction as the inlet portion 19. In the above construction, the engaging projections 10 of the metal plate 4 may be introduced into the inlet portions 19 of the mating engaging sections 18 of the metal plate supporting member 5, and the metallic plate 4 is turned in a prescribed mounting direction, in the direction of the arrow marked a in FIG. 2, with respect to the metallic plate supporting member 5 to cause the engaging projections 10 of the metallic plate 4 to be intruded in the direction of the arrow mark b in FIG. 4 so as to be engaged with the projections 20 of the retaining portion 21 to attach the metal plate 4 to the metal plate supporting member 5.

The perimeter of the supporting member 5 is formed with a pair of cut-outs or recesses 22 at diametrically opposite positions of the metal plate supporting member 5. In these cut-outs 22 are engaged holding means for holding the supporting member 5 so that the force of rotation is not transmitted to the metal plate supporting member 5 when attaching the metal plate 4 to the metal plate supporting member 5.

The disk hub 2, constituted by the metal plate 4 and the metal plate supporting member 5, constructed as above, is attached to the substrate of the disk 1, as follows:

The metal plate supporting member 5 by itself is centered so that the center of the optical disk is in register with the center of the spindle hole 7 formed in the metal plate supporting member 5. The metal plate supporting member 5 is secured at the other surface or the attachment surface thereof secured to the perimeter of the central hole 3 of the substrate of the disk 1 as by adhesion or welding. More precisely, in consideration of the fact that information signals are recorded on the disk a spirally extending track or as a number of concentric tracks, the metal plate supporting member 5 is secured to the substrate of the disk 1 so that the center of the spirally extending track or the concentric tracks is coincident with the center of the spindle hole 7 of the metal plate supporting member 5. It will be noted that, when attaching the metal plate supporting member 5 of synthetic materials to the substrate of the disk 1 by ultrasonic welding means, fusible ribs, for example, may be provided to the surface of the supporting member 5 to be attached to the substrate of the disk for concentrating the ultrasonic waves to the aforementioned surface at the time of welding.

The metal plate supporting member 5 is secured by itself to the substrate of the disk 1 in this manner to prevent an unnecessary force from being produced in the attachment surface during attachment.

When attaching the metal plate 4 to the metal plate supporting member 5, thus mounted on the substrate of the disk 1, engaging and holding arms 23 acting as holding means for holding the supporting member 5 are engaged in the recesses 22 formed on the periphery of the supporting member 5 from both sides of the supporting member 5 to prevent the supporting member 5 from being turned on the substrate of the disk 1. The positioning projections 12 of the supporting arm 11 of the automatic attachment device used for attaching the metal plate 4 to the metal plate supporting member 5 are engaged in the jig engaging holes 13 of the metal plate 4 for holding the metal plate 4 by the supporting arm 11. The engaging projections 10 of the metal plate 4 held by the supporting arm 11 are introduced into the inlet portions 19 of the mating engaging section 18 of the metal plate supporting member 5. The supporting arm 11 is then turned in the attachment direction indicated by the arrow mark a in FIG. 2 to engage the projections 10 in the retaining projections 20 to attach the metal plate 4 to the metal plate supporting member 5.

At this time, the supporting member 5 is retained by the holding arm 20 of the aforementioned holding means and thereby prevented from being turned under the force of rotation of the metal plate 4 so that the force of rotation is not transmitted to the metal plate supporting member 5. The result is that no unnecessary stress is generated in the attachment surfaces between the metal plate supporting member 5 and the substrate of the disk 1.

Now referring to FIGS. 5 to 10, a second embodiment of the present invention will be explained.

In the following description of the present second embodiment, only the portions that are different from the first embodiment will be explained, while the portions same as or equivalent to those of the first embodiment are indicated by the same numerals and the corresponding description is omitted.

Figure 5:
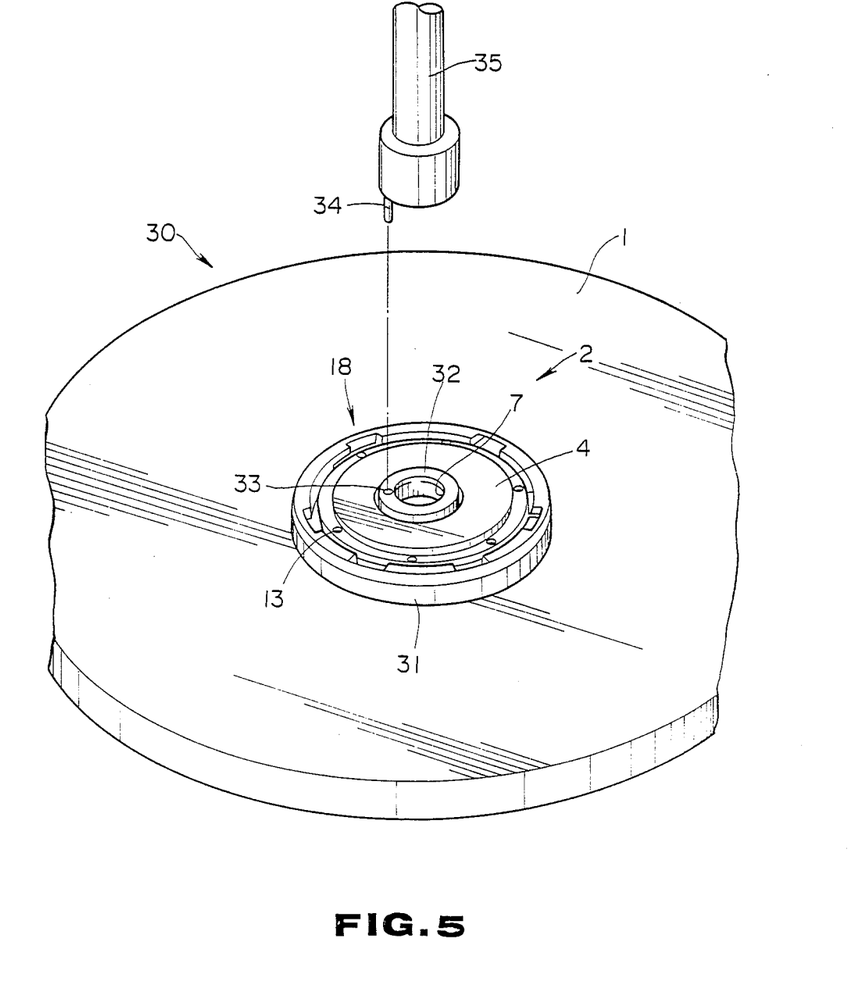
FIG. 5 is a perspective view showing a disk according to a second embodiment of the present invention.

In the disk 30 of the present second embodiment, as shown in FIG. 5, an engaging opening 33 in which the holding means for preventing rotation of the metal plate supporting member 31 is engaged is formed on the major surface 32a of the peripheral wall 32 of the spindle hole of the metal plate supporting member 31 secured to the substrate of the disk 1.

Figure 6:
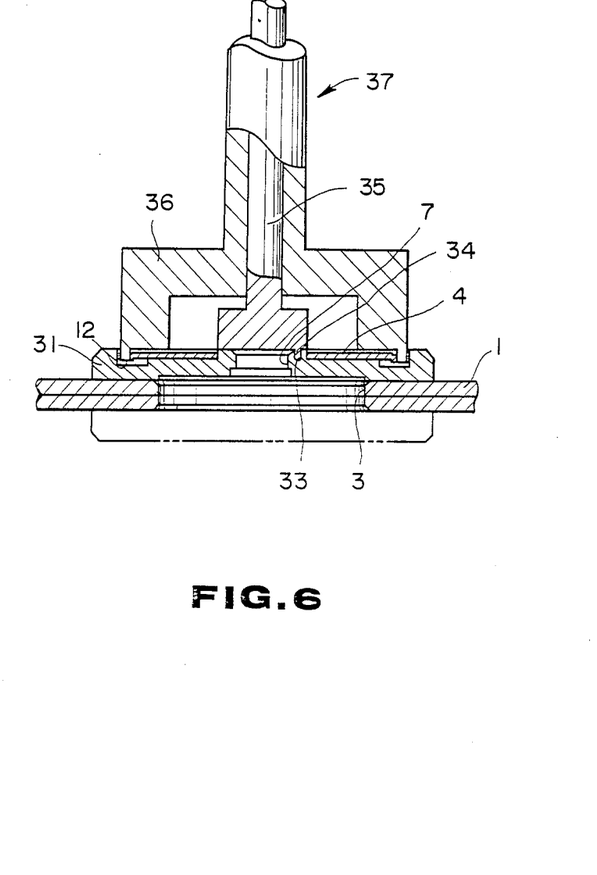
FIG. 6 is a diagrammatic sectional view showing the state of attaching the metal plate to the metal plate supporting member according to the second embodiment.

The metal plate supporting member 31 of the disk 30 of the present embodiment is prevented from being turned by the holding arm 35 having the terminal engaging pin 34 engaging in the opening 33. A metal plate attachment device 37 having a supporting arm 36 mounted coaxially with the holding arm 35 as shown in FIG. 6 is used, in such a manner that, while the metal plate supporting member 31 is prevented from being turned by the holding arm 35, the metal plate 4 is turned by the supporting arm 36 to attach the metal plate 4 to the metal plate supporting member 31.

Figure 7:
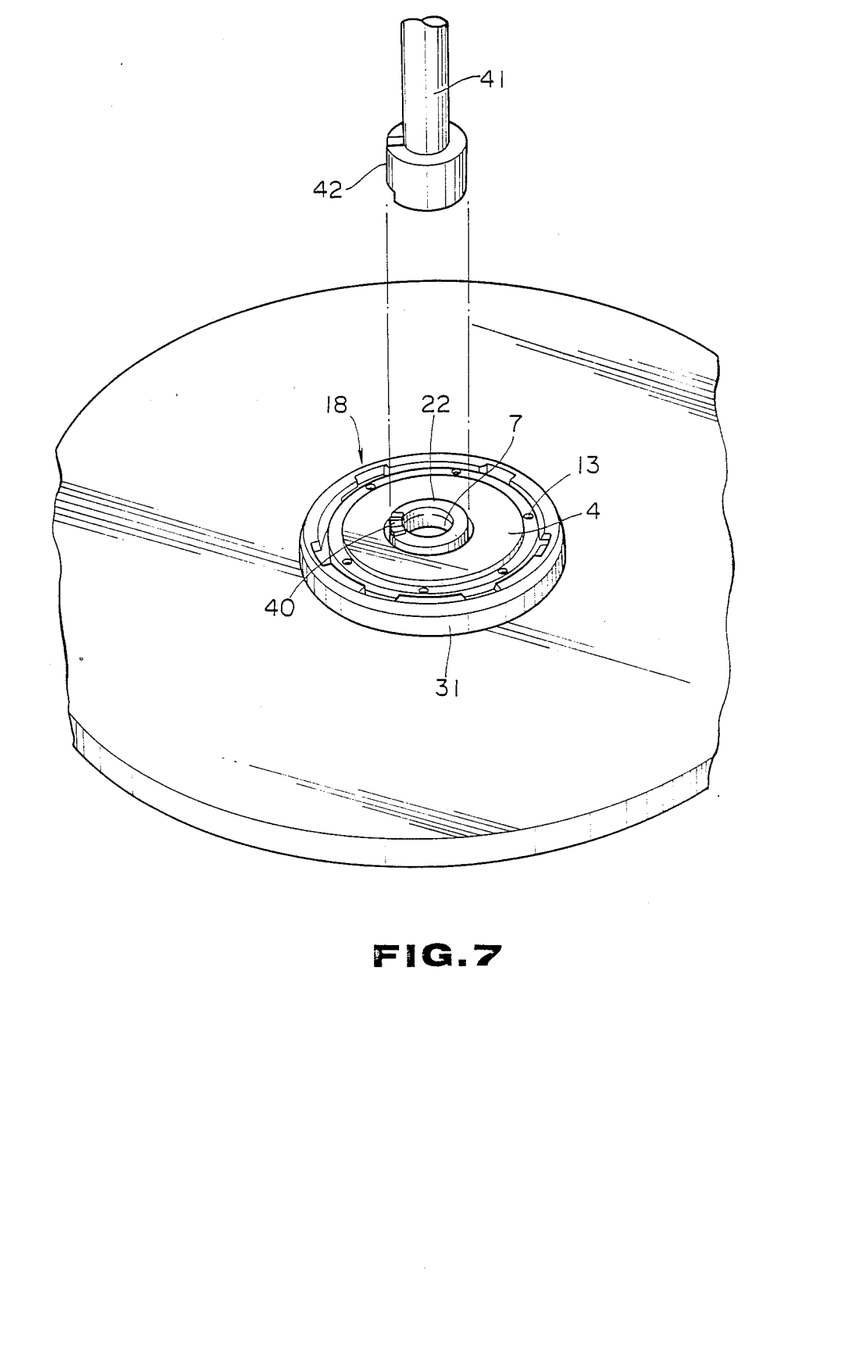
FIG. 7 is a perspective view showing a modification of the metal plate supporting member.

The engaging opening 33 formed on the major surface of the peripheral wall 32 of the spindle hole of the metal plate supporting member 31 for engaging with the holding arm 35 may be replaced by an engaging projection 40 for engaging an engaging projection 40 provided in this case to the holding arm 41, as shown in FIG. 7.

Figure 8:
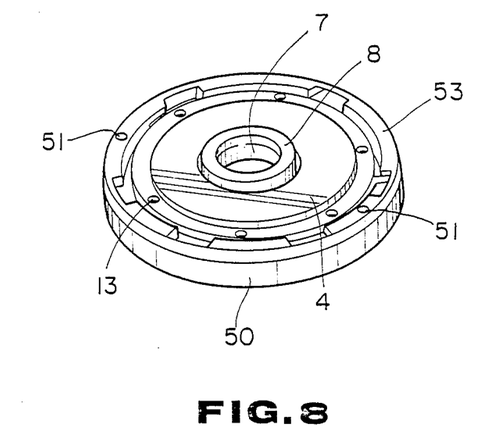
FIG. 8 is a perspective view showing a further modification of the metal plate supporting member.
Figure 9:
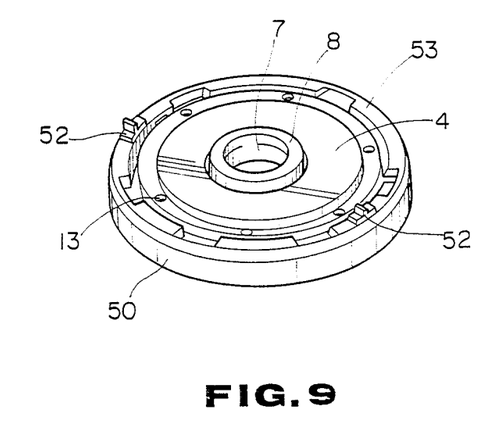
FIG. 9 is a perspective view showing a still further modification of the metal plate supporting member.
Figure 10:
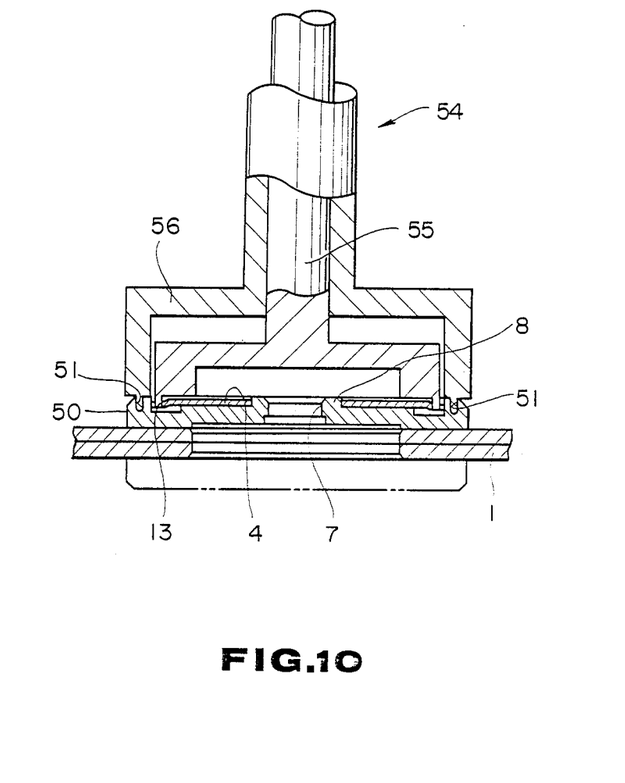
FIG. 10 is a diagrammatic sectional view showing the state of attaching the metal plate to the metal plate supporting member shown in FIG. 8.

Or alternatively, as shown in FIGS. 8 and 9, an engaging opening 51 or an engaging projection 52 for engaging with the holding arm may be formed on the major surface of an upstanding wall 53 forming the outer periphery of the metal plate supporting member 50. In this case, the metal plate attachment device 54 may be so designed that the jig arm 55 is inserted into the inner bore of the holding arm 56, as shown in FIG. 10.

From the foregoing it is seen that the present invention provides a disk in which, when the engaging projection of the metal plate is turned so as to be engaged with and supported by the metal plate supporting member, the metal plate supporting member is controlled in its position by holding means engaging in the retaining portion of the supporting member so that the force of rotation applied to the metal plate is not transmitted to the metal plate supporting member and the force of rotation is not produced in the metal plate supporting member. The result is that no unnecessary shearing force is generated in the attachment surfaces between the substrate of the disk and the metal plate supporting member.

In this manner, the force of attachment between the metal plate supporting member and the substrate of the disk is not deteriorated at the time of attachment of the metallic plate so that there may be provided a disk consisting of a substrate of the disk to which a disk hub is attached strongly.

What is claimed is:

1. A disk for use with a recording and/or reproducing apparatus, comprising:
   a substrate including a recording medium on and/or from which information signals may be recorded and/or reproduced by said reproducing and/or reproducing apparatus; and
   a disk hub including a metal plate having engaging projections, said plate being attached by a magnet provided on a rotary drive means of said recording and/or reproducing apparatus, and a supporting member for said metal plate having a containing section formed on one surface thereof for containing said metal plate and having mating engaging portions, said engaging projections being engaged with said mating engaging portions, another surface of said supporting member being secured to the disk adjacent to the center thereof, said metal plate being adapted for turning with respect to said supporting member in a prescribed direction so as to be attached to said supporting member,
   said supporting member being formed with a retaining section at a central portion thereof for cooperating with a holding member separate from said disk for preventing said supporting member from turning when attaching the metal plate to said supporting member.

2. A disk according to claim 1 wherein said supporting member is circular and said retaining section is formed in the perimeter of said supporting member.

3. A disk according to claim 2 wherein said retaining section is formed by cutting out a side wall of the outer periphery of said supporting member.

4. A disk according to claim 2 wherein said retaining section includes a plurality of elements arranged respectively on straight lines passing through the center of the supporting member.

5. A disk according to claim 4 wherein said retaining elements each comprise a recess.

6. A disk according to claim 1, wherein said retaining section is formed as a projection for engaging in a recess formed in said holding member.

7. A disk for use with a recording and/or reproducing apparatus, comprising:
   a substrate including a recording medium on and/or from which information signals may be recorded and/or reproduced by said recording and/or reproducing apparatus; and
   a disk hub including a metal plate having engaging projections, said plate being attracted by a magnet provided on a rotary drive means of said recording and/or reproducing apparatus, and a supporting member for said metal plate having a containing section formed on one surface thereof for containing said metal plate and having mating engaging portions, said engaging projections being engaged with said mating.engaging portions, another surface of said supporting member being secured tot eh disk adjacent to the center thereof, said metal plate being adapted for turning with respect to said supporting member in a prescribed direction so as to be attached to said supporting member,
   said supporting member being formed with a retaining section for cooperating with a holding member for preventing said supporting member from turning when attaching the metal plate to said supporting member,
   wherein said supporting member is circular and has at least an upstanding wall on an inner periphery thereof and said retaining section is formed in said upstanding wall.

8. A disk according to claim 7 wherein said retaining section is formed in the upstanding wall on the inner periphery of said supporting member.

9. A disk according to claim 8 wherein said upstanding wall is formed on the perimeter of a spindle bore formed in said supporting member.

10. A disk according to claim 8 wherein said retaining section is formed on an upper surface of the upstanding wall on the inner periphery of said supporting member.

11. A disk according to claim 10 wherein said retaining section is formed as an opening for engaging a projection provided on said holding member.

12. A disk according to claim 7 wherein said retaining section is formed on an upper surface of said upstanding wall.

13. A disk according to claim 7 wherein said retaining section is formed as a projection for engaging with a recess formed in said holding member.

14. A disk according to claim 7 wherein said retaining section is formed as a recess for engaging with a projection provided on said holding member.

15. A method for producing a disk having a disk hub, said disk hub including a metal plate attracted by a magnet provided on a driving means that is part of a recording and/or reproducing apparatus, and a supporting member for said metal plate, said metal plate being attached to one surface of said supporting member, another surface of said supporting member being secured to a substrate of the disk, said method comprising the steps of securing said supporting member to a central portion of said substrate of the disk by securing means, holding the thus secured supporting member by applying holding means to a central portion of said supporting member so that said supporting member is not turned relative to said substrate of the disk, turning said metal plate by using attachment means for attaching said metal plate to said supporting member held by said holding means, and removing said holding means.

* * * * *

UNITED STATES PATENT AND TRADEMARK OFFICE
CERTIFICATE OF CORRECTION

PATENT NO. : 4,926,410

DATED : May 15, 1990

INVENTOR(S) : Akira Suzuki, Kenji Takashashi

It is certified that error appears in the above-identified patent and that said Letters Patent is hereby corrected as shown below:

ON TITLE PAGE:
In <u>References Cited</u>, U.S. Patent #4,829,510 change "Takehashi" to --Takahashi--

In the drawings, sheet 1 of 8, consisting of Fig. 1 should read as shown on the attached page.

Col. 7, line 62, change "reproducing" to --recording--
line 65, change "attached" to --attracted--

Col. 8, lines 46 & 47, change "tot eh" to -- to the--

Signed and Sealed this

Twenty-second Day of October, 1991

Attest:

HARRY F. MANBECK, JR.

*Attesting Officer*     *Commissioner of Patents and Trademarks*

FIG.1
PRIOR ART